Feb. 8, 1955  A. E. COMSTOCK  2,701,651
APPARATUS FOR HANDLING ARTICLES TO BE NESTED
Filed June 6, 1950  4 Sheets-Sheet 1
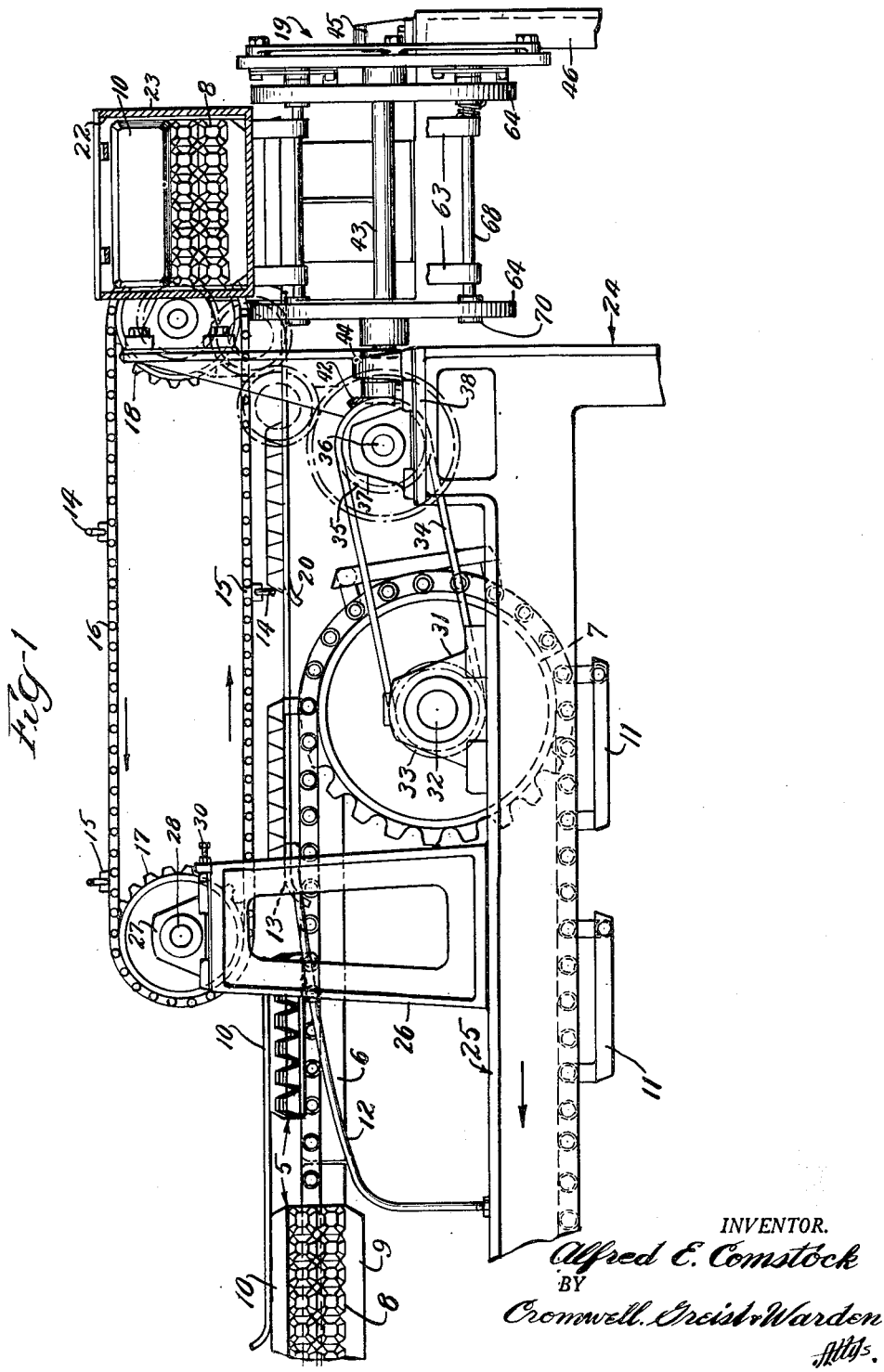
INVENTOR.
Alfred E. Comstock
BY
Cromwell, Greist & Warden
Attys.

Feb. 8, 1955  A. E. COMSTOCK  2,701,651
APPARATUS FOR HANDLING ARTICLES TO BE NESTED
Filed June 6, 1950  4 Sheets-Sheet 2
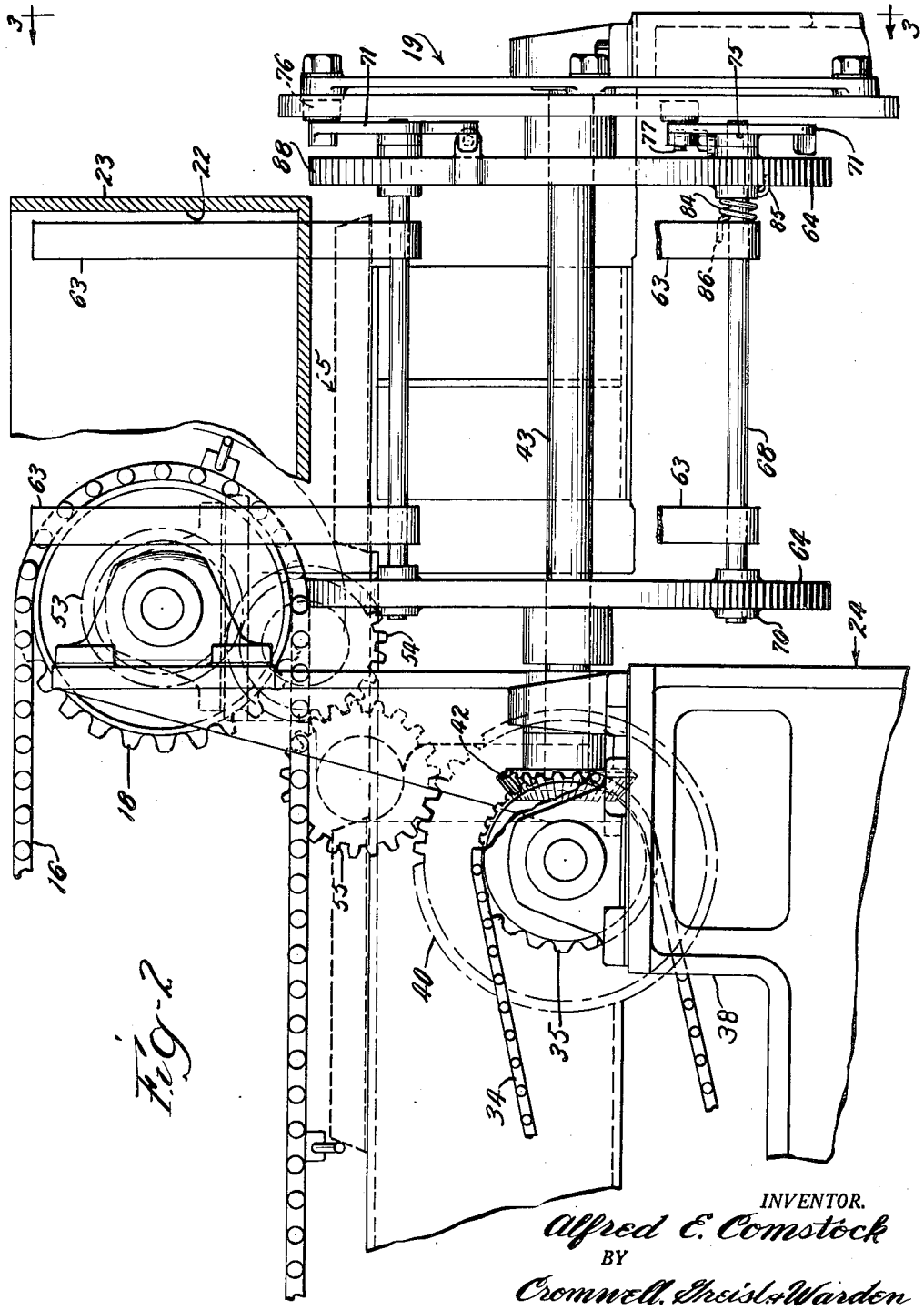
INVENTOR.
Alfred E. Comstock
BY
Cromwell, Greist & Warden
Attys.

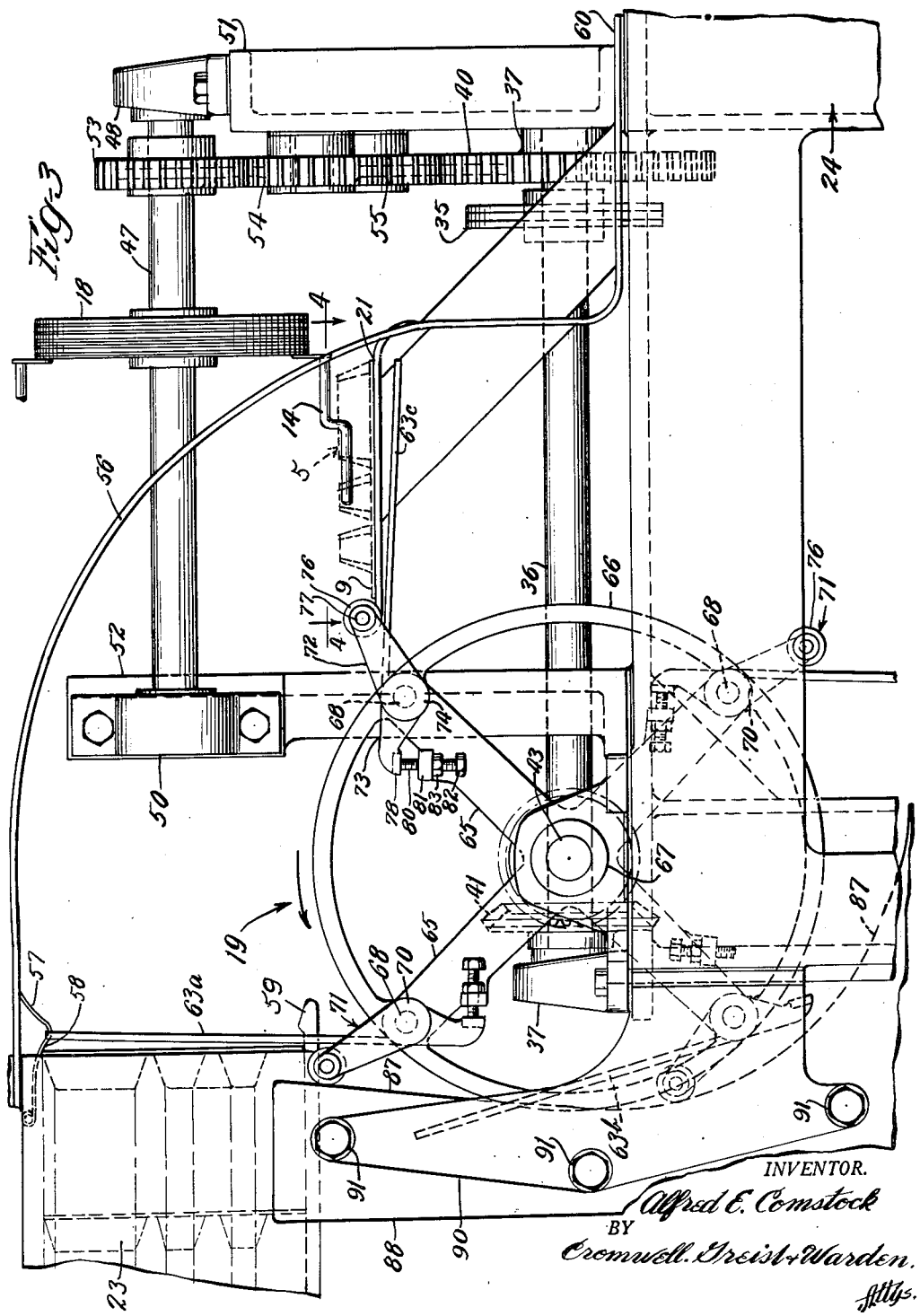

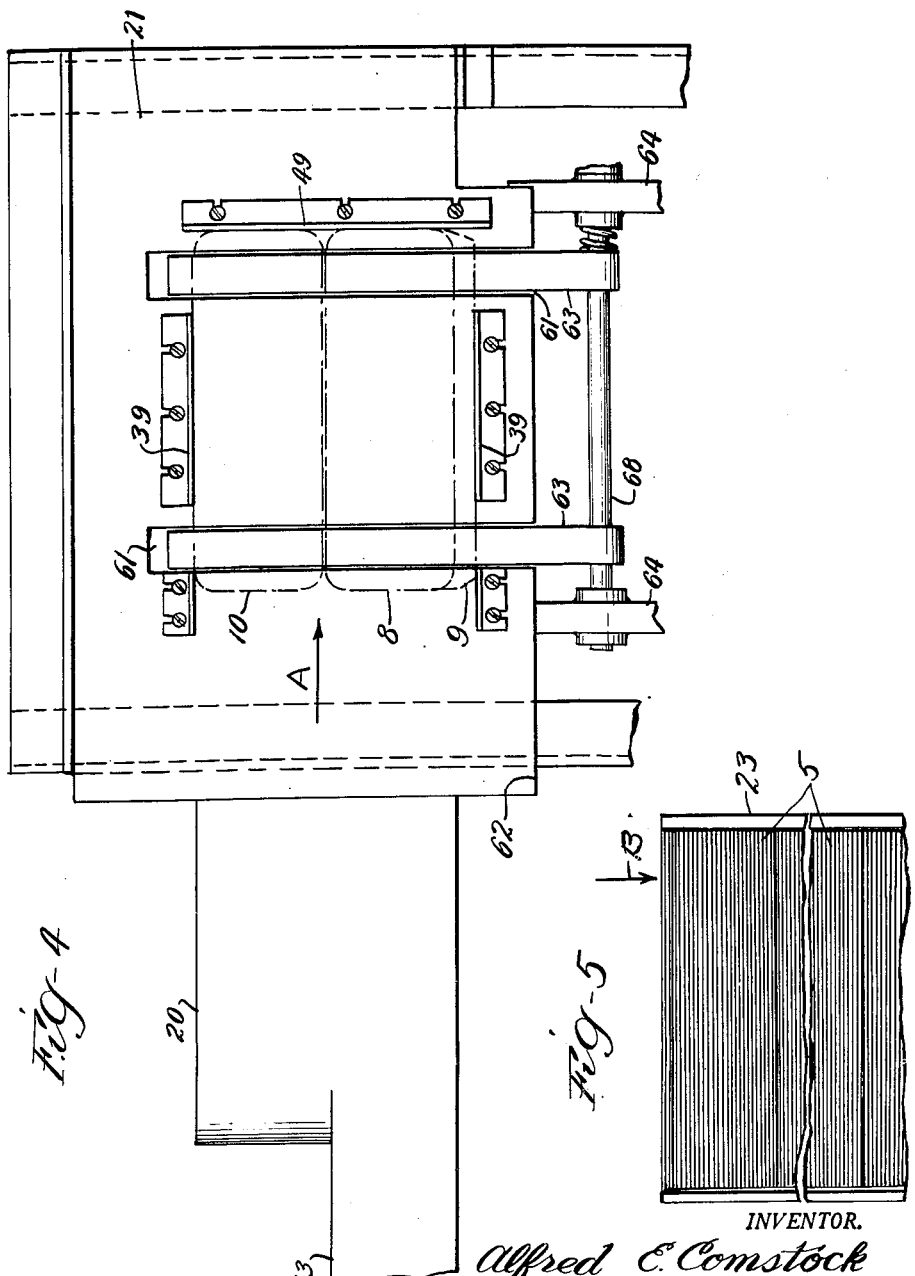

2,701,651
Patented Feb. 8, 1955

United States Patent Office

2,701,651

APPARATUS FOR HANDLING ARTICLES TO BE NESTED

Alfred E. Comstock, Palmer, Mass., assignor to General Package Corporation, a corporation of Delaware Application June 6, 1950, Serial No. 166,443

3 Claims. (Cl. 214—7)

The present invention relates, generally, to automatic type apparatus for handling articles which can be nested together in a stack, such as molded egg cartons, and it relates particularly to innovations and improvements in such automatic type apparatus whereby articles to be nested are removed or stripped from supports on a continuous type conveyor and conveyed or transferred one-by-one onto a stationary platform from which they are lifted and nested onto the end of a stack of the articles.

The present invention is broadly useful in connection with all types of articles which are adapted to be nested or stacked together for packaging purposes. However, by way of illustration, the invention will be described in connection with the 2 x 6 molded pulp egg cartons shown and described in copending application Serial No. 169,460, filed on June 21, 1950 by John W. Cox. Other articles which may be handled by the apparatus of the present invention include such items as berry baskets, paper cups, helmets, bushel baskets, pails, headlight reflectors, etc.

The object of the present invention, generally stated, is the provision of new and improved automatic type apparatus adapted to receive articles of the class described from a conveyor, remove and transfer the articles onto a platform, and lift the articles from the platform by a rotary movement and deposit and stack each article in nested relationship in a receptacle through a filling opening therein.

An important object of the invention is an automatic type apparatus which operates to convey a line of unnested articles and discharge the articles one-by-one onto the platform of a rotary stacker wherefrom each article is in turn lifted by one of a series of article engaging members traveling in a generally circular path and carried to a position where each article is nested onto the end of a stack of the articles lying in the path of said circulating members, each of said members being rearwardly tilted so as to clear said stack and then forwardly tilted to be ready to pick up another article from the platform.

An important object of the invention is a rotary stacker having a platform for receiving from a conveyor mechanism articles to be nested, a rotary type article lifting device having article engaging fingers or members projecting therefrom and adapted in the course of rotation to pass through one or more openings in the platform, or past the opposite sides thereof, and lift an article therefrom and tilt it through an arc, usually of approximately 90°, so as to deposit the article through a filling opening in a receptacle where it is nested onto the end of a stack of the articles previously deposited and stacked therein. A further object is to have the article engaging fingers flexibly mounted on the rotating wheel structure so that they may be rearwardly tilted after depositing an article into the filling opening of a receptacle thereby permitting each article engaging finger or member to clear and pass by the receptacle and stack of articles therein. Still another object is to have the article engaging fingers provided with crank arms which carry cam followers adapted to engage a cam track when each article engaging member or finger reaches the position where it deposits one of the articles into the receptacle so that the cam follower causes the finger first to tilt rearwardly with respect to its normal position thereby allowing it to clear the receptacle and thereafter guides the article engaging finger or member back to its normal article engaging position.

An important object of the invention is a rotary type stacker mechanism capable of rapidly and positively removing articles from a horizontal platform and depositing and nesting them into a receptacle having a filling opening lying in a vertical plane without damaging the articles even though they may be formed of such material as paperboard.

Certain other objects of the invention will, in part, be obvious and will, in part, appear hereinafter.

For a more complete understanding of the nature and scope of the present invention, reference may now be had to the following detailed description thereof taken in connection with the accompanying drawings, wherein:

Fig. 1 is a side elevational view of an apparatus constituting one embodiment of the invention and which operates to strip molded pulp egg cartons from supporting blocks on a conveyor, convey or transfer the stripped cartons in open flattened condition to a support platform from the discharge end of which they are lifted and transferred into a receptacle having a vertical opening through which the articles are nested;

Fig. 2 is a fragmentary elevational view on enlarged scale of the right end portion of the apparatus shown in Fig. 1 and including the discharge end of the support platform, the packaging receptacle into which the articles are nested, and the rotary mechanism for lifting the articles off from the platform and depositing them into the receptacle;

Fig. 3 is an end elevational view taken on line 3—3 of Fig. 2;

Fig. 4 is a fragmentary plan view of the support platform taken on enlarged scale on line 4—4 of Fig. 3; and Fig. 5 is a fragmentary top plan view of the receptacle into which the cartons are stacked and showing part of the stack of cartons nested therein.

Referring to the drawings, molded pulp egg cartons 5 are shown being delivered to the discharge end of a conveyor mechanism comprising a conveyor chain composed of a series of interconnected links 6 which run over a return bend drive sprocket 7. The egg cartons 5 may be of the type shown and described in the aforementioned application Serial No. 169,460 of John W. Cox which comprise a bottom portion 8 having a plurality of egg receiving compartments or cells and having integrally hinged thereto a cover 10. Each bottom half 8 has a flap 9 integrally formed thereon which is folded internally when the carton is closed. Each of the links 6 carries a form or block 11 shaped to receive the cover portion 10 of the cartons 5. The conveyor composed of the links 6 may, for example, serve to conduct the cartons 5 from a printing mechanism (not shown) wherein as a final step in the manufacture of the cartons the top panels of the cover portion 10 are printed with desired legends and indicia. As the cartons 5 are conveyed on the blocks 11 along the upper run of the conveyor chain, the bottom halves 8 are permitted to hang downwardly along the sides of the forms or blocks 11 as shown in Fig. 1.

A plow or sweep 12 in the form of a curved rod is mounted adjacent the return bend of the conveyor chain formed by the links 6 so as to engage the inside of the leading edge of each of the bottom halves 8 of the egg cartons 5 as they reach the return bend. The sweep 12 serves to turn or fold the downwardly hanging bottom half 8 of each carton 5 upwardly to a flat or horizontal position and guide it onto a platform member or section 13 which forms an extension of the sweep 12. A second platform member or section 20 is located to one side of section 13 and forms an extension of the upper run of the endless chain of support blocks 11. The section 13 projects beyond section 20 a sufficient distance that the bottom half 8 of each carton is resting thereon when the corresponding support block 11 reaches the return sprocket 7. This arrangement causes each top half 10 to ride upon the platform section 20 and be stripped from the support block 11.

Before each of the cartons 5 is fully stripped or removed from its supporting form or block 11, the rear end of the cover 10 thereof is engaged by a pusher bar 14 supported by a fixture 15 on the side of an endless pusher chain 16. The chain 16 runs over an idler sprocket 17 at one end and over a drive sprocket 18 at the opposite end. The chain 16 is provided with a plurality of the fixtures 15 which carry the pusher rods or members 14 located at regular intervals so as to engage the rear side of each of the cartons 5 as it reaches the return bend and begins to descend around the pulley 7.

The pushers 14 serve to move and convey the stripped cartons onto the discharge end 21 of the platform. The discharge end 21 is so positioned with respect to the conveyor chain 16 that each carton 5 is deposited and properly positioned thereon just as the engaging pusher bar 14 begins to travel upwardly around the sprocket 18 and disengages the rear end of the carton.

A rotary mechanism which is indicated generally at 19 operates to lift each of the egg cartons 5 off from the platform end 21 and turn the carton upwardly through an arc of 90° and deposit into the vertical filling or receiving opening 22 of a receptacle 23 in which the cartons 5 are nested. The rotary mechanism 19 and its method of operation will be described in detail below.

The egg carton handling apparatus includes a suitable frame structure of conventional design, and suitable power driving mechanism for operating the several moving parts in proper timed relationship one with another. The frame structure for the apparatus is indicated generally at 24, the exact details thereof being of known and conventional design and not forming a part of the present invention. The frame 24 has a horizontal platform portion indicated generally at 25 on which various parts of the apparatus are mounted. A pair of spaced apart standards 26—26 are mounted on the platform 25 and serve to support bearings 27—27 in which are journaled the opposite ends of a shaft 28 which carries the sprocket wheel 17. The bearings 27 are shiftably or adjustably mounted on the tops of the standards 26 and may be adjusted and locked in position by set screws 30—30 so as to permit the chain 16 to be tightened properly.

A pair of bearings 31—31 are mounted on the platform 25 and serve to support a drive shaft 32 which carries the sprocket 7. The drive shaft 32 is connected with a suitable source of power such, for example, as a separate electric motor (not shown) or with the power input for driving the other apparatus (not shown) with which the apparatus shown in the drawings is associated. In either driving arrangement, the present apparatus is driven in timed relationship with the associated apparatus such, for example, as a printer. The drive shaft 32 also carries a sprocket wheel 33 over which runs a drive chain 34 which runs over a sprocket wheel 35 mounted on a shaft 36 which is supported at opposite ends in bearings 37—37 mounted on a step 38 forming part of the frame structure 24. On the end of the shaft 36 adjacent the sprocket 35 a gear wheel 40 is mounted while at the opposite end of the shaft 36 a beveled gear 41 is mounted. The beveled gear 41 meshes with a beveled gear 42 mounted on one end of a shaft 43 which serves as the drive shaft for the rotary article lifting mechanism 19. The shaft 43 is supported adjacent one end in a bearing 44 mounted on the step 38 and at the opposite end is supported by a bearing 45 mounted on an upright frame member 46 forming a portion of the frame structure 24.

Referring to Fig. 3 of the drawings, it will be seen that the drive sprocket 18 carrying the chain 16 is mounted on a supporting shaft 47 journaled at opposite ends in bearings 48 and 50. The bearing 48 is mounted on the top of a support member 51 carried by the frame 24 while the bearing 50 is mounted on the side of an upright support member 52 also supported on the main frame 24.

The shaft 47 carries a gear wheel 53 which is driven by the gear wheel 40 through a gear train comprising pinion gears 54 and 55. The pinion gears 54 and 55 are mounted on stub shafts carried on the inside of the frame member 51.

The platform discharge end 21 is supported from one side where it is attached to an arcuate guide or guard 56 (Fig. 3), the upper end of which has spring clip members 57 over which a container or chute for egg cartons may be placed so as to serve the receptacle 23. The spring clips 57 have downwardly projecting detent portions 58 which serve to catch and retain the upper edge of the egg cartons after they have been deposited into the receptacle 23. The hood 56 has a laterally extending bottom portion 60 by which it is supported from the frame 24. The bottom edges of the cartons 5 when inserted into the receptacle 23 pass over stationary catches 59 located beneath the detents 58.

Referring to Fig. 4, it will be seen that the platform end 21 is provided with longitudinal slot shaped openings 61—61 located adjacent opposite sides thereof and extending at right angles to the direction in which the cartons 5 are fed thereon as indicated by the arrow A. The openings 61 are open-ended and extend inwardly from the edge 62 of the platform.

The openings 61 or their equivalent are provided so that egg cartons deposited on the platform portion 21 may be lifted therefrom by a set of article engaging fingers 63—63 which form parts of the rotary mechanism 19. The platform end 21 is provided with upstanding guides 39—39 and an end stop 49 for accurately positioning each carton 5 thereon.

The rotary mechanism 19 includes a wheel structure which is mounted on the shaft 43 and which includes a pair of spaced side members 64—64 which may be in the form of castings each having four spokes 65—65 and a rim portion 66. The spokes 65 project from a central hub 67 which fits over the shaft 43. The spokes of the two side members 64 are aligned and are interconnected by four cross rods 68—68 extending therebetween adjacent the wheel rim 66. The cross rods 68 are journaled at opposite ends in journals 70—70 provided therefor and integrally formed as part of the side member castings 64.

One end of each of the rods 68 projects beyond the outside of one of the side frames 64 sufficiently so that a crank arm 71 may be attached thereto as shown in Figs. 2 and 3. Each of the crank arms 71 includes an outwardly projecting section 72 which extends beyond the rim 66 of the adjacent side member 64 and a section 73 which extends within the rim 66. The sections 72 and 73 join at a hub portion 74 which fits over the end of the supporting cross rod 68 and is pinned thereto by a pin 75 as shown in Fig. 2.

A cam following roller 76 is carried on the outer end of each of the crank arms 71 by means of a supporting pin 77. The inner end of each of the crank arms 71 is provided with a flat button 78 formed integrally therewith and adapted to engage the end of a set screw 80 provided for each of the crank arms 71. Each set screw 80 is carried in a nut 81 integrally formed on the side of the adjacent spoke 65 and has a head 82 and a lock nut 83.

The article engaging fingers or members 63 mounted on each of the crossrods 68 are aligned in the same plane and each of the associated set screws 80 is so adjusted that as the wheel structure rotates the fingers 63 will pass through the openings 61 in the platform discharge end 21 and in passing therethrough will lie in a substantially horizontal plane. This is the normal and article engaging position of the finger 63.

Each set of the article engaging fingers 63 is urged and held in this normal position where the button 78 on its associated crank arm 71 engages the set screw 80, by means of a coil spring 84 which fits over each of the respective cross rods 68 in between one of the wheel side members 64 and the adjacent article engaging finger 63 as shown, for example, in Fig. 2. One of the ends 85 of the coil spring 84 is anchored in the adjacent side frame member 64 while the other end 86 is fastened in the adjacent article engaging finger or member 63. The springs 84 are inserted under tension so that each set of fingers 63 and the associated crank arms 71 are normally urged and held in the position where the fingers are horizontal as they pass through the slot openings 61 in the supporting platform. The coil springs 84 also press and bias the buttons 78 against the set screws 80.

During a portion of the rotation of the wheel structure the cam following rollers 76 engage and follow down a cam track 87 (Fig. 3) of a cam plate 88 supported from the apparatus frame by a bracket 90. The cam plate 88 is attached to the bracket 90 by three bolts 91—91. The cam plate 88 is mounted so that as the wheel structure rotates in a counterclockwise direction as viewed in Fig. 3, each of the rollers 76 engages the upper end of the cam track 87 when the associated set of article engaging fingers, such as those designated at 63a in Fig. 3, are brought into a vertical position where they deposit the lifted egg carton or other article into the filling opening of the receptacle 23. Except for some provision for tilting the fingers 63a rearwardly, they would on continued rotation of the wheel structure strike the stack of nested egg cartons and the front of the receptacle 23 and would not pass underneath. However, in the construction shown, the article engaging fingers 63a are flexible in that they are permitted to rotate or tilt rearwardly against the force of the associated coil spring 84. The cam track 87 is so shaped that each roller 76 turns its associated crank arm 71 in such a way as to cause each set of article engaging fingers 63 to clear the underside of the stack and the front edge of the receptacle 23. In Fig. 3 one of the sets of article engaging fingers is shown in broken line and designated at 63b in a position which it occupies shortly after it clears the bottom front edge of the receptacle 23.

The lower portion of the cam track 87 is so shaped that it permits the coil springs 84 to return the spring fingers 63 to their normal position where the associated button portion 78 engages the set screw and wherein the article engaging fingers 63 will be in a horizontal plane when they again pass upwardly through the slot openings 61 in the carton supporting platform. The cam track 87 allows the article engaging fingers 63 to be fully returned to this normal position before the cam rollers 76 leave the track. In this way the return of the spring fingers is accomplished in an even and gentle fashion without snap action.

The apparatus described above and shown in the drawings operates in the following manner: The egg cartons 5 are conveyed along on the support blocks 11 on the upper run of the conveyor chain consisting of the sections or links 6. As these cartons approach the position where the supporting blocks 11 start to travel around the return bend provided by the sprocket wheel 7, the inside of the front edge of the depending bottom portion 8 of each carton 5 engages the plow or sweep 12 after which one of the pusher bars 14 engages the rear edge of the cover portion 10.

As the carton 5 travels forwardly from this position the bottom half 8 of the carton is folded up by the plow 12 until it is horizontal and flat and rests on the platform member or extension 13. During this movement, the carton is engaged by a pusher bar 14. The cover portion 10 of the carton is stripped or lifted from the supporting block or form 11 as the cover portion 10 of the carton reaches the platform member 20.

The engaging pusher bar 14 continues to move each stripped carton forwardly and deposit it on the platform discharge end 21 so that the opposite ends lie over the slot openings 61. The engaging pusher 14 then separates from the rear edge of the carton and begins to climb up around the return bend provided by the sprocket wheel 18 as soon as the carton 5 has been properly positioned on the platform. The rotating mechanism 19 is operated at such a speed that after each carton has been so deposited on the platform end 21, and before another carton reaches the platform, one of the sets of article engaging fingers or members 63 travels up through the slot openings 61 in the platform and lifts the carton therefrom and tilts and sweeps it through an arc of approximately 90° so as to deposit it in through the filling opening 22 of the receptacle 23. In Fig. 3 the article engaging fingers 63a are shown in the position which they occupy just before they reach the true vertical position while the set of spring fingers designated at 63c are in the position they occupy just before reaching the horizontal position where they travel through the slot openings 61. The article engaging fingers project the upper edge of the cartons underneath the detents 58 in the spring clips 57 so that the upper edge is caught thereunder and the bottom edge of the carton is projected over the catches 29. As the wheel structure continues to rotate the spring fingers 63 are rearwardly tilted by action of the cam rollers 76 engaging with the cam track 87 so as to clear the receptacle 23.

The receptacle 23 may be a paperboard container of the type in which the egg cartons 5 are shipped or packaged for shipment. If desired, the receptacle 23 may take the form of a permanent receptacle, such as a wooden chute open at the top, from which the stacked and counted egg cartons may be removed from time to time as they build up a stack therein as shown from the top in Fig. 5, the cartons being stacked in the direction of arrow B.

It is to be understood that those skilled in the art will be able to make certain modifications and changes in the apparatus shown and described without departing from the spirit and scope of the invention. For example, additional article engaging fingers may be added in which case one or more slot openings will be provided in the platform 21. Accordingly, the foregoing disclosure is intended to be interpreted as illustrative and not in a limited scope.

What is claimed as new is:

1. Apparatus of the class described adapted to successively lift articles from a platform having at least one open-ended opening extending therein from an edge and turn each lifted article upwardly through an arc of approximately 90° and nest it into the vertical filling opening of a receptacle for said nested articles, said apparatus including a wheel structure adapted to be mounted for rotation about a horizontal axis and comprising, a pair of parallel spaced wheel side frame members, a plurality of cross rods extending between said side members adjacent the peripheries thereof and at regularly spaced intervals therearound, bearing means on said wheel side frame members whereby each of said rods is rotatable about its longitudinal axis, an article engaging member rigidly mounted on each of said rods and adapted to pass through said platform opening while lying in a substantially horizontal plane, a coil spring fitting over each of said rods having one end anchored to one of said side members and having the other end operatively connected to the associated cross rod, a crank arm mounted on each of said cross rods with all of said crank arms aligned in a single plane, a cam follower mounted on each of said crank arms, said coil springs biasing each of said rods in the direction toward which said wheel structure is adapted to rotate, stop means for each of said crank arms supported on one of said side members and serving to stop said coil springs from biasing said rods beyond a normal position wherein each of said article engaging members is substantially horizontal as it passes through said platform opening, a single non-continuous cam track mounted so as to be successively engaged by each of said cam followers each time the associated article engaging member is turned up vertically so as to deposit an article into said receptacle filling opening, said cam track being so shaped that after being contacted by one of said cam followers the associated article engaging member is caused to tilt rearwardly from its normal position against the force of the associated spring and rotate down underneath said receptacle without engagement therewith, and said cam track continuing to guide each of said article engaging members until it returns to its normal position where its associated crank arm rests against said associated stop means.

2. Apparatus for handling nestable articles of the type described having hinged sections, comprising, a conveyor having an endless chain of support blocks on which one of the hinged sections of said nestable articles may be supported with the other hinged section hanging down to the side, a sweep disposed adjacent the return bend of said conveyor, a table member located at the upper end of said sweep, said sweep being adapted and disposed to engage successively under each of said downwardly hanging hinged sections so as to turn said sections upwardly to a horizontal position where they are supported on said table member, a second table member disposed rearwardly of said first table member and in line with said endless chain of support blocks and disposed so as to receive each of said hinged sections carried on one of said support blocks as said block reaches said return bend of said conveyor, a platform disposed adjacent the ends of said first and second table members, an endless conveyor chain having a horizontal bottom run disposed above said second table member, article pushing members carried on said conveyor chain in regular spaced relationship so as to engage behind each of said articles on said second table member and transfer it to said platform, said platform having at least one open-ended opening therein which extends inwardly from the edge of one side thereof, a receptacle into which articles may be nested disposed above said platform and having a vertical filling opening therein, rotary means for lifting articles from said platform and nesting them into said receptacle through said filling opening, and driving means for operating said apparatus operatively interconnected with said conveyor, said endless conveyor chain and said rotary means whereby said rotary means lifts articles from said platform at the rate they are deposited thereon by said endless conveyor chain, said rotary means comprising, a wheel mounted for rotation about a horizontal axis, a plurality of yieldable article engaging fingers projecting from the periphery of said wheel at regularly spaced intervals so as to pass through said platform opening as said wheel rotates and lift an article therefrom and turn it upwardly through an arc of approximately 90° and deposit it in nesting relationship into said vertical filling opening in said receptacle, the yieldability of each of said article engaging fingers permitting it to tilt rearwardly as said wheel rotates and thereby clear said receptacle.

3. Apparatus of the class described for handling molded pulp egg cartons of the type having bottom and cover halves which are integrally hinged together, comprising, a conveyor having an endless chain of support blocks on which one of said hinged halves of said cartons may be supported with the other hinged half hanging down to one side, a sweep disposed adjacent the return bend of said conveyor, a platform located at the upper end of said sweep and at a height approximately even with the upper run of said conveyor, said platform having one section which forms a carton supporting extension of the upper end of said sweep, said sweep being so adapted and disposed as to engage in turn under each of said downwardly hanging hinged halves and sweep it up to horizontal position where it passes onto said platform section, said platform having a second section extending alongside of said first section and forming a carton supporting extension of the upper run of said conveyor whereby the conveyor block-supported half of each carton as it reaches the return bend of said conveyor with its other half already supported on said first platform section passes onto said second platform section, a carton advancing means including an endless chain the bottom run of which extends over said platform and which has a plurality of carton pushing members adapted to engage the rear end of each of said cartons at the return bend of said conveyor and to advance each of said cartons to the discharge end of said platform, wheel means from the periphery of which project a plurality of article pick-up members which are rearwardly tiltable from a normal article engaging position and which upon rotation of said wheel means in turn engage and pick up an article from said discharge end of said platform and upon continued rotation nest it onto the end of a stack of said articles, and means for rearwardly tilting each of said members so as to clear said stack and for returning each of said members to its said normal position after clearing said stack.

References Cited in the file of this patent

UNITED STATES PATENTS

| | | |
|---|---|---|
| 987,185 | Steedman | Mar. 21, 1911 |
| 1,181,567 | Bredenberg | May 2, 1916 |
| 1,556,991 | Hippenmeyer | Oct. 13, 1925 |
| 1,974,931 | Rose | Sept. 25, 1934 |
| 2,003,519 | Schnaier | June 4, 1935 |
| 2,345,012 | Sillars | Mar. 28, 1944 |
| 2,345,645 | Wickwire, Jr. et al. | Apr. 4, 1944 |
| 2,585,554 | Jackson | Feb. 12, 1952 |